3,412,250
IRRADIATION DEVICE FOR USE IN SWIMMING
POOL NUCLEAR REACTORS
Philippe A. P. Arragon, Grenoble, Jean Gentil, Condrieu, and Maurice Seguin, Grenoble, France, assignors to Commissariat a l'Energie Atomique, Paris, France
Filed June 7, 1965, Ser. No. 461,686
Claims priority, application France, June 10, 1964, 977,826
8 Claims. (Cl. 250—106)

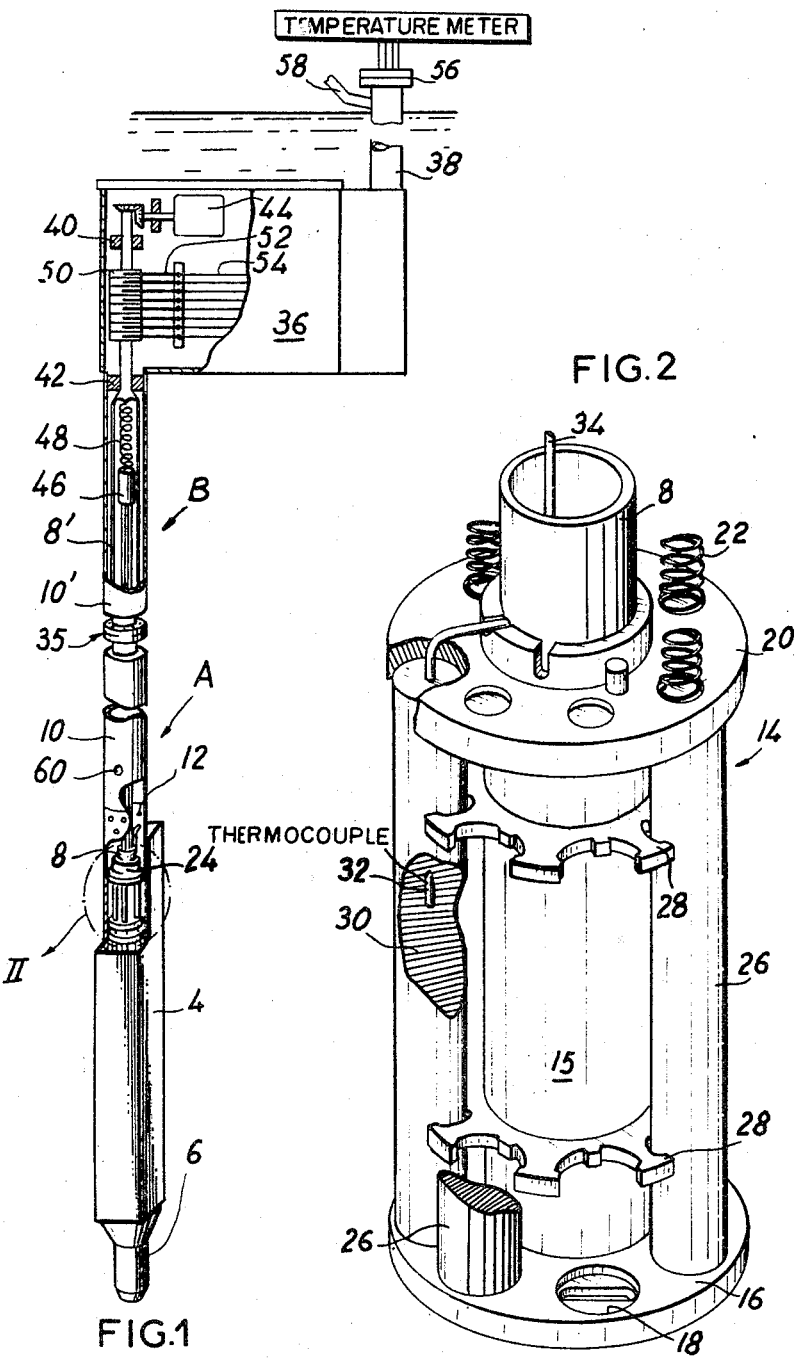

ABSTRACT OF THE DISCLOSURE

Sample cells to be irradiated in the flux of a nuclear reactor are mounted in a holder and spaced about its circumference. The holder is mounted on a shaft for rotation therewith and means are provided to rotate the shaft and holder in the nuclear flux.

---

This invention is directed to an irradiation device for exposing a number of similar samples to the same radiation dose and for measuring said dose.

The neutron irradiation of samples is usually carried out by maintaining irradiation cells in the neutron flux of a reactor core over a sufficient period of time. The measurement of the dose which is in fact received is then taken by placing a dosimeter close to the sample. However, it cannot in that case be certain that the measured dose is in fact the dose which the sample has received. Furthermore, if a number of cells are exposed at the same time, it is a matter of difficulty to ensure identical irradiation in all samples owing to flux heterogeneity which cannot be eliminated entirely.

In order to overcome this drawback, it has already been proposed to direct all of the samples along the same path within the neutron flux of the reactor. However, this solution does not prove fully satisfactory, especially by reason of the fact that the flux is of course not absolutely constant in time.

This invention is directed to the design concept of an irradiation device which meets practical requirements more effectively than devices of the prior art, especially insofar as it permits of identical irradiation of a plurality of samples and accurate measurement of the radiation dose to which they are exposed.

To this end, the invention proposes a device for the irradiation of samples which comprises a rotary shaft, one portion of which penetrates into the irradiation flux, at least one support unit which is integral with said shaft and which is provided wih a plurality of recesses for accommodating irradiation cells and at least one cell for measuring neutron radiation and/or γ-radiation dosages, said recesses being uniformly spaced along a circumference which is centered on said shaft.

In a preferred form of embodiment of the invention, a plurality of support units are mounted in alignment along the shaft, each support unit being fitted with a measuring cell. As will be apparent, it is also possible to replace one of the irradiation cells by a reference cell for the measurement of temperature when a knowledge of this parameter is necessary. It is also possible to employ as a temperature-measuring cell an irradiation cell which is identical with the others, except for the addition of a thermocouple which traverses the cell wall and penetrates into the sample contained therein.

The invention further consists in other arrangements which are preferably to be contemplated for use in conjunction with the preceding but which can be employed independently thereof. All of these arrangements will become more readily apparent from a perusal of the following description of a device constituting one mode of application of the invention which is given solely by way of example and not in any limiting sense. Reference is made in the description to the accompanying drawings, in which:

FIG. 1 is a fragmentary longitudinal sectional view of the irradiation device;

FIG. 2 is an enlarged fragmentary view in perspective of that portion of the device which is designated by the reference II in FIG. 1.

The device which is illustrated is intended for the irradiation of graphite samples which are placed within leak-tight stainless steel cells in a helium atmosphere, said cells being placed within the core of a nuclear reactor of the swimming-pool type. This device consists of a lower section A which is intended to be inserted in the reactor core and an upper section B which is intended to be immersed in the pool water outside the high-flux zone.

The irradiation location is materialized by a water box 4 having an external shape which is identical with that of a fuel element of the reactor. Said water box therefore terminates in a tubular connector 6 which is intended to fit into the core support grid (not shown in the drawings).

The lower section A of the device proper consists of a shaft section 8 which is rotatably mounted in a casing-tube 10. When said casing-tube is in position, it fits into the upper extremity of the water box 4 and is centered therein. The tube 10 is pierced by a series of openings 12 for the admission of pool coolant water which is sucked along the water box 4 and through the end connector 6 into the reactor coolant circuit.

In the form of embodiment which is illustrated, the shaft section 8 is provided with five superposed support units such as the unit 14 which is shown in FIG. 2. Said support unit 14, which is formed of aluminum for example, essentially consists of a cage comprising an internal sleeve 15 and an end-plate 16 which is rigidly fixed to the shaft and a cap 20. The end-plate 16 is provided with a series of recesses such as the recess 18 which are uniformly spaced along a circumference which is centered on the shaft. The cap 20 is slidably mounted on the sleeve 15 and is urged towards the end-plate 18 by a series of springs such as the spring 22 which are advantageously formed of a nickel alloy and compressed between the cap 20 and the end-plate of that support unit which is placed immediately above. Only the springs of the top support unit which is shown in FIG. 1 bear directly on a ring 24 which is fixed to the shaft. The irradiation cells such as the cell 26 are fitted within recesses 18 and maintained therein by virtue of the pressure exerted by the top cap. As an additional safety measure, provision is usually made for an aluminum wire which completes the fixation of the irradiation cells, said cells being centered at intermediate points by means of spacer grids 28.

Of the seven cells which are carried by each support unit, five consist of irradiation cells containing samples to be exposed to radiation, another cell consists of a dosimeter (not shown) for measuring the radiation received and finally another cell consists of a temperature-measurement unit containing a reference sample 30 in which is placed a thermocouple 32. The thermocouple wires pass through the plug of the corresponding cell through a leak-tight joint formed, for example by arc welding in an argon atmosphere. The five reference samples as well as the five dosimeters are preferably aligned along a same generator-line. The measuring wires 34 which pass out of said samples and dosimeters traverse the wall of the tubular driving shaft 8, then extend within the interior of said shaft to section B which is located outside the flux region.

Different arrangements can be contemplated. In particular, the same cell can be employed for the purpose of taking measurements of both temperature and radiation dosages. In that case, the cell receives a sample which is fitted with a thermocouple and an integrating dosimeter, for example in the form of a disc 3 mm. in diameter and 0.1 mm. in thickness.

The cells are cooled by the downwardly circulating water which flows through the water box 4. The temperatures of the irradiation samples and reference sample are thus determined on the one hand by the heat developed by radiation absorption and, on the other hand, by the cooling which results from heat transfer processes between the water and the irradiation cells.

The temperature of the samples is usually established within the range of 30 to 40° C. along the axis in the case of a very small clearance between samples and cell and in respect of an energy absorption rate of approximately 4 w./g. within the graphite: in order that this temperature should be the same within all of the samples and above all equal to the temperature within the reference sample, it is evidently necessary to ensure that the thermal resistance between the graphite and the irradiation cell is the same in all of the cells; since the thermal resistance is essentially dependent on the positional adjustment of the sample within the cell, this operation must therefore be carried out with care. For example, in the case of an actual assembly which is mentioned by way of illustration, a machining error of ±0.02 mm. on the internal diameter of the cell or on the diameter of the sample results in a variation of ±1.2° C. in the temperature of the graphite.

The upper section B of the device comprises a rotary shaft section 8' which is disposed co-axially with a casing-tube section 10'. The shaft sections 8 and 8' are coupled to each other by means of a driving locking-pin which has not been shown in the drawings. The upper section 10' of the casing-tube is coupled to the section 10 by means of a leak-tight flanged joint 35 which can be disassembled.

The upper section opens into a box or housing 36 which is intended to receive a number of different mechanisms which will be described hereinafter and to provide a relative horizontal displacement of the biological shielding between the casing-tube and a second vertical tube 38 which extends outside of the body of water of the reactor.

The two shaft sections 8 and 8' are suspended from the box by means of a roller-bearing 40 and guided at the outlet of the box by a roller-bearing 42 and within the water box by means of centering members which are not shown in FIG. 1. The bearings are designed to run dry; the centering members can consist of three sapphires spaced at 120° and rotatable within a stainless steel ring.

The rotary drive to the shaft is effected from a reduction-gear motor 44 which is mounted within the box 36. The speed of rotation will as a rule be a few revolutions per minute, namely 14 r.p.m. in one form of embodiment which has actually been employed.

The temperatures measured by means of the thermocouples 32 are re-transmitted to measuring instruments placed outside of the reactor tank via the conductors 34 which are divided into two portions as in the case of the shaft and casing-tube. The said two portions are connected together by means of micro-connectors 46 which, when the device is assembled, are disposed at a level above that of the flanged joint 35 in order to facilitate disassembly as will become apparent hereinafter. As a further means of providing ready access to said micro-connectors at the time of disassembly, that section 48 of the conductors 34 which is located above the micro-connectors is endowed with a certain degree of elasticity by winding in a helical configuration.

The conductors 34 terminate in conducting rings such as the ring 50 which are insulated both from each other and from the box. A stationary brush 52 is applied in rubbing contact with each ring 50. A conductor 54 which is connected to each brush is passed inside the vertical tube 38 and is brought out of this latter through a leak-tight gland 56 placed above the level of the pool water; additional frictional-contact or rubbing devices (not shown in the drawings) can be provided for the purpose of removing dust particles which are liable to cause fluctuating errors in the measurement of temperatures.

Since those mechanisms which are placed within the box and at least within section 10' of the casing-tube are intended to run in the dry state, the upper section B of the device accordingly constitutes a leak-tight enclosure. A branch 58 serves to introduce within said enclosure a neutral gas under pressure such as helium, for example. This gas serves to force the water back to the level of a control opening 60 which is formed in the section 10 of the casing-tube.

Provision is also made for a control panel, which is not shown in FIG. 1. Said control panel comprises a helium-pressure regulator which is intended to maintain the level of water within the casing-tube at a substantially constant level, a pressure indicator fitted with an alarm contactor, a circuit for low-voltage supply to the reduction-gear motor 44 and a temperature recorder. An overload contactor is advantageously provided for the purpose of cutting off the supply of current to the reduction-gear motor 44 in the event of overload resulting, for example, from accidental locking of the rotary shaft.

The operation of the device which has just been described is apparent from the foregoing description and will therefore be described only briefly with a view to setting forth the advantages of the device.

The loading operation is performed simply by lowering the device so as to engage the lower extremity of the casing-tube within the water box 4. The dimensions of the device are such that, once the device is in position, a depth of water of the order of 4 meters at least remains above the box 36 in order that operators who pass above the pool-water area may thus be protected against radioactive radiation. Once the device has been placed in position, helium is conveyed through the branch 58 until bubbles appear through the control opening 60: the pressure is then reduced slightly in order to cause the water to rise above the opening in section 10. The device is then ready to operate. Other solutions can of course be adopted for the purpose of fixing the level of helium without loss of gas.

The unloading operation is carried out by means of a series of reverse operations until the flanged joint 35 emerges from the water. The lower section A is then secured against further motion, whereupon the flanged joint is disassembled and the upper section B is lifted over a distance of a few hundred millimeters. The two shaft sections 8 and 8' can then be separated by withdrawal of the locking-pin. The lower section 10 is evidently attached to the lower flange of the joint 35 in order to hold said section in position.

The box is then lifted once again over a distance of approximately 300 millimeters in order to gain access to the micro-connectors 46 and to disconnect these latter. The sections A and B are then completely uncoupled and the section A which is the only radioactive portion is transferred to a hot cell.

The replacement of one or a number of groups of samples or even all of the samples can be effected within the hot cell before returning the device to the irradiation position.

The replacement of the irradiation cells 26 is carried out in respect of each group in turn: the aluminum safety wire is cut, the cap 20 is lifted by compressing the springs 22 and the cells are withdrawn. The reference sample 30 can either remain in situ or be changed after shearing and removal of its thermocouple conductor 34; in this latter case, the cell is replaced by a fresh unit fitted with a reference sample 30 and a new thermocouple 32.

The recovery of samples makes it necessary to open the cells. This operation is performed by means of a conventional cutting tool of any suitable design, in the vicinity of a reference mark which is cut at the top of a cell. At this level, the tool terminates in a free space of a few millimeters which is formed between the sample and the cell plug. This space is preferably packed with aluminum wool so as to remove the heat which is evolved in the top portion of the sample.

The advantages of the device which has just been described are self-evident. By means of this device, a number of samples can be subjected to strictly equal doses and substantially at the same temperature which is measured in an accurate manner. Moreover, the samples can be exposed to different radiation doses prior to replacement in the hot cell. It is thus possible to determine the action of the different parameters which have an effect on the phenomenon being studied such as, for example, the action of radiation and the kinetics of recovery.

It is wholly apparent that the invention is not limited to the form of embodiment as given solely by way of example in the foregoing and it must be understood that the scope of this patent extends to alternative forms of either all or a part of the device herein described which remain within the definition of equivalent means.

What we claim is:

1. Irradiation device for exposing a plurality of similar sample cells containing samples to radiation from a nuclear reactor comprising a shaft rotatable about its axis, one section of said shaft being located in a radiation flux from the reactor, at least one support unit securely connected to said shaft, a plurality of recesses in said unit receiving said cells around said shaft, said recesses being spaced along a circumference centered on the axis of said shaft and driving means for rotating said shaft at a substantially constant speed.

2. Radiation device as described in claim 1, said support unit comprising an end plate fixed to said shaft, a cap and resilient means for urging said cap towards said end plate forcing said cells against the bottom of said recesses in said end plate.

3. Irradiation device as described in claim 2 including a plurality of said support units mounted in alignment along said shaft, said resilient means being springs compressed between said cap of one of said support units and said end plate of the adjacent one of said units.

4. Irradiation device as described in claim 2 including a casing tube containing said shaft and said support unit, said casing tube and said shaft each comprising upper and lower sections and demountable joints connecting said sections.

5. Irradiation device as described in claim 4, said support unit including an additional recess, a temperature measuring cell in said additional recess including a thermocouple, a conductor for said thermocouple passing through said shaft, a ring connected to said conductor and mounted on said supper section of said shaft and a stationary brush mounted in rubbing contact with said ring.

6. Irradiation device as described in claim 5, said conductor having a length greater than the length of said shaft, said conductor comprising two wire portions and a disconnectable micro-connector joining said wire portions and located substantially level with said demountable joints.

7. Irradiation device as described in claim 1, the nuclear reactor being a swimming pool reactor, said device comprising a lower vertical section including said rotary shaft immersed in the pool water, and the upper section extending from the pool water, a part of said upper section being horizontally displaced in said upper section.

8. Irradiation device as described in claim 7, said upper section being a vertical tube, said coupling box and said tube providing a leak-tight enclosure and means for delivering gas under pressure into said enclosure forcing water out of said coupling box and out of the top portion of said vertical tube.

References Cited
UNITED STATES PATENTS 3,042,803  7/1962  Martelly _____ 250—52 X

FOREIGN PATENTS 1,336,223  7/1963  France.

ARCHIE R. BORCHELT, *Primary Examiner.*